United States Patent [19]

Dierkes et al.

[11] Patent Number: 4,819,104
[45] Date of Patent: Apr. 4, 1989

[54] DISK PACK DRIVE WITH ELECTRIC MOTOR HAVING SINTERED PERMANENT MAGNETS

[75] Inventors: Albert Dierkes, Planegg; Joachim Gilly; Ernst Grecksch, both of Estenfeld; Friedrich Schellenberger, Hammelburg, all of Fed. Rep. of Germany

[73] Assignee: Siemens Aktiengesellschaft, Berlin and Munich, Fed. Rep. of Germany

[21] Appl. No.: 909,218

[22] Filed: Sep. 18, 1986

[30] Foreign Application Priority Data

Sep. 30, 1985 [DE] Fed. Rep. of Germany ....... 3534852

[51] Int. Cl.$^4$ ............................................. G11B 5/012
[52] U.S. Cl. ............................. 360/98.01; 360/99.08; 360/133
[58] Field of Search ................ 310/44, 45, 67 R, 154, 310/156; 335/296, 297, 302; 29/598, 607, 608; 264/DIG. 58; 360/97-99, 86, 133, 135; 369/258, 266

[56] References Cited

U.S. PATENT DOCUMENTS

| 3,974,406 | 8/1976 | Wehde | 310/67 R |
| 4,311,933 | 1/1982 | Riggs et al. | 310/156 |
| 4,535,373 | 8/1985 | Schuh | 360/97 |

FOREIGN PATENT DOCUMENTS

| 56-7410 | 1/1981 | Japan | 335/302 |
| 59-111305 | 6/1984 | Japan | 335/302 |
| 60-0157204 | 8/1985 | Japan | 335/296 |

OTHER PUBLICATIONS

Patents Abstracts of Japan, vol. 6, Nr. 182 (E-131) [1060], 18, Sep. 1982; & JP-A-57 97 354 (Hitachi).

Primary Examiner—John H. Wolff
Attorney, Agent, or Firm—Kenyon & Kenyon

[57] ABSTRACT

A low-cost, compact disk pack drive with an external rotor motor permanent magnet-excited by sintered ferrite magnets in the form of partial shells is to be provided. The external rotor motor is arranged inside the pack space of the disk pack and sintered ferrite excitation magnets are used, having a surface metallization which have been sealed.

5 Claims, 1 Drawing Sheet

DISK PACK DRIVE WITH ELECTRIC MOTOR HAVING SINTERED PERMANENT MAGNETS

BACKGROUND OF THE INVENTION

The invention relates to a disk pack drive with an internal electric motor.

In known drives, the electric motor drive is disposed in a separate motor space sealed from the so-called clean space containing the memory disks. Normally the magnets used for such purpose are removed from a press mold and their surfaces are then ground. This procedure involves the danger that abrasion particles adhere to the magnets, or, that in subsequent steps, particles are separated, from the magnets in particular by edge chipping, which could then contaminate the clean space containing the memory disks if the motor space and the clean space are not insulated form each other.

SUMMARY OF THE INVENTION

The present invention has as its object the use of permanent magnet excited motors, which in themselves are inexpensive, even for disk drives where the motor is arranged in the center of the pack and hence inside the pack space, so as to obtain a high packing density and as small as possible an overall volume. For this purpose it is necessary to eliminate all danger of contamination by the drive motor. It has been found, however, that with conventional permanent magnet-excited motors particle separation cannot be completely prevented in the regular use of the motors even with intensive washing of the magnets.

According to the invention, however, prevention of particle separation and hence the use of permanent magnet-excited drive motors inside the pack space of a disk pack is readily possible at little additional cost if the ferrite core is sealed by a surface metallization. Thus, protection against any particle separation can be ensured with a seal formed by a thin film of uniform thickness over the entire surface.

An expecially effective and adhering surface metallization has been obtained with a nickel metallization. Besides the chemical application of the sealed surface metallization, coating by electroplating or vapor deposition may also be used.

BRIEF DESCRIPTION OF THE FIGURES

In the following, the invention will be explained more specifically with reference to an embodiment shown diagrammatically, in the drawings wherein.

DETAILED DESCRIPTION OF THE INVENTION

Figure 1:
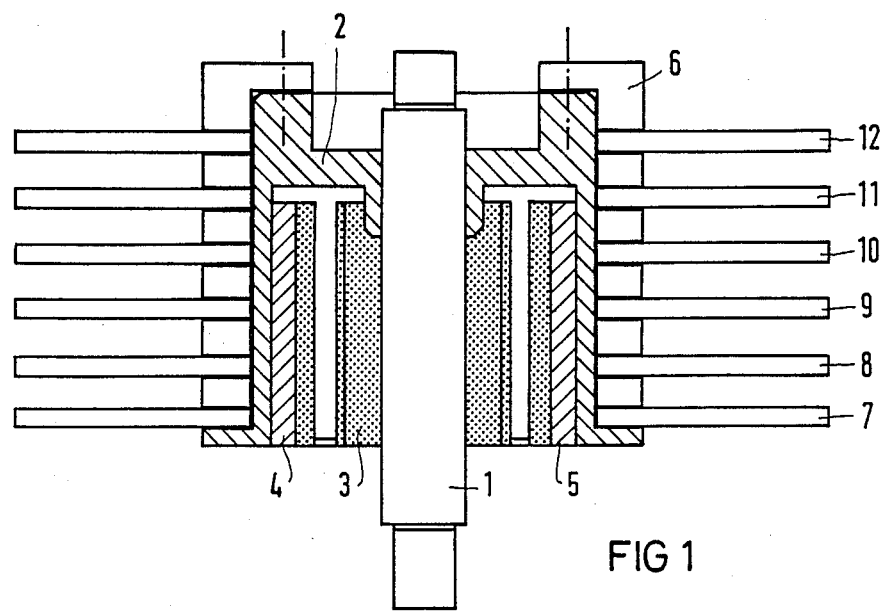
FIG. 1 shows the rotor of a permanent magnet-excited disk pack driven by an electric motor with several sintered ferrite magnets in the form of partial shells.

FIG. 1 shows the external rotor of an electric-motor disk pack drive with permanent magnet excitation, disposed inside the pack space. A hub 2 secured on the rotor shaft 1 of the disk drive holds memory disks 7-12 mounted on its outer surface, by means of a clamping ring 6. On the inner surface of the hub there are four sintered ferrite magnets, in the form of partial shells used as excitation magnets, of which three sintered ferrite magnets 3,4, 5 are visible in the drawing.

Figure 2:
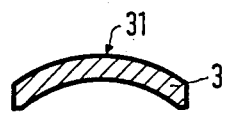
FIG. 2, shows a section of a single sintered ferrite magnet taken along II—II in FIG. 3.
Figure 3:
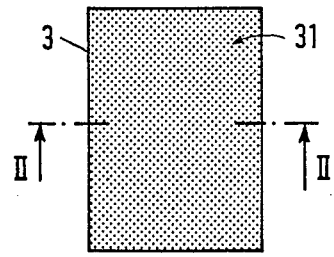
FIG. 3, shows a radial top view of a single sintered ferrite magnet.

As can be seen in particular with reference to a single sintered ferrite magnet 3 shown in section in FIG. 2, the surface of the sintered ferrite magnets is sealed, according to the invention, by a surface metallization, here bearing the reference symbol 31.

Preferably the surface metallization is applied chemically to the magnet by coating the magnet with a nickel compound which reacts with the sintered magnet to form a metallic nickel seal. Alternatively the metallic nickel may be applied to the magnet by other methods such as electroplating or vapor deposition.

What is claimed is:

1. A disk pack drive comprising:
   a hub defining a disk pack drive space;
   a plurality of memory disks disposed on said hub; and
   an electric motor disposed in said disk pack drive space and including an external rotor comprising a plurality of sintered ferrite magnets mounted on said hub, and a shaft, said sintered ferrite magnets being sealed by surface metallization for protecting said memory disks from contamination by particles from said magnets.

2. Electric motor disk pack drive according to claim 1, characterized in that a chemically applied surface metallization is provided for the sintered ferrite magnets.

3. Electric motor disk pack drive according to claim 1, characterized in that the surface metallization is provided by electroplating sintered ferrite magnets.

4. Electric motor disk pack drive according to claim 1, characterized in that the surface metallization applied by vapor deposition on the sintered ferrite magnets.

5. Electric motor disk pack drive according to claim 1, characterized in that the ferrite magnet is sealed by a surface nickel metallization for the sintered ferrite magnets.

* * * * *